United States Patent
Cui et al.

(10) Patent No.: US 10,773,216 B2
(45) Date of Patent: Sep. 15, 2020

(54) METHOD FOR PREPARING HIGH-STRENGTH ANTI-POLLUTION ANTIBACTERIAL HOLLOW FIBER MEMBRANE AND PRODUCT PREPARED THEREFROM

(71) Applicant: GUIZHOU MATERIAL INDUSTRIAL TECHNOLOGY INSTITUTE, Guiyang (CN)

(72) Inventors: Zhenyu Cui, Guiyang (CN); Gaoyi Xie, Guiyang (CN); Shuhao Qin, Guiyang (CN); Jingkui Yang, Guiyang (CN); Kaizhou Zhang, Guiyang (CN); Dajun Luo, Guiyang (CN); Huiju Shao, Guiyang (CN); Jinbo Jin, Guiyang (CN)

(73) Assignee: Guizhou Material Industrial Technology Institute (CN)

( * ) Notice: Subject to any disclaimer, the term of this patent is extended or adjusted under 35 U.S.C. 154(b) by 115 days.

(21) Appl. No.: 16/300,534

(22) PCT Filed: Jun. 1, 2016

(86) PCT No.: PCT/CN2016/084236
§ 371 (c)(1),
(2) Date: Nov. 9, 2018

(87) PCT Pub. No.: WO2017/193430
PCT Pub. Date: Nov. 16, 2017

(65) Prior Publication Data
US 2019/0282968 A1    Sep. 19, 2019

(30) Foreign Application Priority Data
May 11, 2016   (CN) .......................... 2016 1 0305975

(51) Int. Cl.
| | |
|---|---|
| *B01D 67/00* | (2006.01) |
| *B01D 69/08* | (2006.01) |
| *B01D 71/28* | (2006.01) |
| *B01D 71/34* | (2006.01) |
| *B01D 71/40* | (2006.01) |
| *B01D 69/02* | (2006.01) |
| *B01D 71/06* | (2006.01) |
| *B01D 61/02* | (2006.01) |

(52) U.S. Cl.
CPC ......... *B01D 67/0006* (2013.01); *B01D 67/00* (2013.01); *B01D 67/0093* (2013.01); *B01D 69/02* (2013.01); *B01D 69/08* (2013.01); *B01D 71/06* (2013.01); *B01D 71/28* (2013.01); *B01D 71/34* (2013.01); *B01D 71/40* (2013.01); *B01D 61/027* (2013.01); *B01D 2323/30* (2013.01); *B01D 2325/24* (2013.01); *B01D 2325/48* (2013.01)

(58) Field of Classification Search
None
See application file for complete search history.

(56) References Cited

U.S. PATENT DOCUMENTS

| | | | |
|---|---|---|---|
| 5,510,195 A | 4/1996 | Sano et al. | |
| 6,652,751 B1 | 11/2003 | Kutowy et al. | |
| 2011/0120937 A1* | 5/2011 | Ishizuka | B01D 63/061 210/493.1 |
| 2015/0231572 A1* | 8/2015 | Vankelecom | B01D 67/0013 427/337 |

FOREIGN PATENT DOCUMENTS

| | | |
|---|---|---|
| CN | 101125934 A | 2/2008 |
| CN | 103861468 A | 6/2014 |
| CN | 104548959 A | 4/2015 |
| CN | 104548969 A | 4/2015 |
| CN | 105778363 A | 7/2016 |
| CN | 105688692 B | 6/2018 |
| WO | WO 2011/046514 A2 | 4/2011 |
| WO | WO 2017/193430 A1 | 11/2017 |

OTHER PUBLICATIONS

International Search Report dated Feb. 14, 2017 issued in Application No. PCT/CN2016/084236.

* cited by examiner

*Primary Examiner* — Krishnan S Menon
(74) *Attorney, Agent, or Firm* — Weaver Austin Villenueve & Sampson LLP

(57) ABSTRACT

Disclosed are a method for preparing a high-strength anti-pollution anti-bacterial hollow fiber nano-filtration membrane and a product prepared by the method. The method comprises: S1, a chemical crosslinking reaction: placing an ultra-filtration base membrane in an acidic aqueous solution of glucose or an aqueous solution of phytic acid for a chemical crosslinking reaction to obtain a nano-filtration membrane; S2, a neutralization reaction immersing the nano-filtration membrane obtained in step S1 in an aqueous solution of alkali for the neutralization reaction, then washing the membrane to be neutral; S3, loading inorganic antibacterial agent: placing the membrane obtained in step S2 in an inorganic anti-bacterial agent solution for complexation, thereby obtaining a high-strength anti-pollution anti-bacterial hollow fiber nano-filtration membrane.

12 Claims, No Drawings

METHOD FOR PREPARING HIGH-STRENGTH ANTI-POLLUTION ANTIBACTERIAL HOLLOW FIBER MEMBRANE AND PRODUCT PREPARED THEREFROM

CROSS REFERENCE TO RELATED APPLICATION

This application is under 37 U.S.C. § 371 a national stage application of PCT application PCT/CN2016/084236, filed on Jun. 1, 2016, which claims priority to and the benefit of Chinese Patent Application No. 201610305975.4, filed with the State Intellectual Property Office of China on May 11, 2016; all of the above prior applications are incorporated by reference for all purposes in their entireties.

TECHNICAL FIELD

The present disclosure relates to a method for preparing a high-strength anti-pollution anti-bacterial hollow fiber nano-filtration membrane and a product prepared by the method. In particular, the present disclosure relates to the field of membrane separation technology.

BACKGROUND ART

Nano-filtration, also known as low-pressure reverse osmosis, is characterized by its high retention rate for divalent or multivalent ions and small molecules with molecular weight cut-off in the range of 200 to 1000 $g \cdot mol^{-1}$, while its retention rate for monovalent ions is relatively low. With the development of membrane separation technology, the application of nano-filtration has been extended to industrial fields such as drinking water purification, wastewater treatment, grading and concentration of pharmaceutical products, solvent recovery and so on.

At present, the membrane-forming materials commonly used such as PVDF (polyvinylidene fluoride), PSF (polysulfone) or PES (polyether sulfone) are all linear polymers, in which the spacing between molecular chains is large, resulting in the poor desalination effect. Although a three-dimensional structure can be formed by crosslinking, the hydrophilicity of the material has great influence on the flux and anti-pollution property of the membrane. After the functional groups of the hydrophilic crosslinking monomers have been cross-linked, the functional groups are consumed, thereby reducing the hydrophilicity, flux and anti-pollution property of the membrane. In addition, microorganisms and bacteria in water will deposit and reproduce on the nano-filtration membrane during its use, and form a biofilm which results in pollution of the nano-filtration membrane, causing a sharp decrease in the flux of the membrane. Therefore, in order to solve one of the above problems, it is particularly necessary to develop a method for preparing a hollow fiber nano-filtration membrane which has excellent mechanical property, high membrane flux, and high anti-pollution, anti-bacterial properties.

SUMMARY

In order to solve one of the insufficiencies existing in the prior art, the present disclosure provides a method for preparing a high-strength anti-pollution anti-bacterial hollow fiber nano-filtration membrane and a product prepared by the method. The method can obtain a nano-filtration membrane with good mechanical property, high anti-pollution performance and excellent anti-bacterial property.

In order to achieve the above object, the present disclosure provides the following technical solutions:

a method for preparing a high-strength anti-pollution anti-bacterial hollow fiber nano-filtration membrane comprises:

S1, a chemical crosslinking reaction: placing an ultra-filtration base membrane in an acidic aqueous solution of glucose or an aqueous solution of phytic acid for the chemical crosslinking reaction to obtain a nano-filtration membrane;

S2, a neutralization reaction: immersing the nano-filtration membrane obtained in step S1 in an alkali solution for the neutralization reaction, and then washing the membrane to be neutral;

S3, loading inorganic antibacterial agent: placing the membrane obtained in step S2 in an inorganic anti-bacterial agent solution for complexation, thereby obtaining a high-strength anti-pollution anti-bacterial hollow fiber nano-filtration membrane.

In the above method for preparing a high-strength anti-pollution anti-bacterial hollow fiber nano-filtration membrane, the specific procedure of step S1 of the chemical crosslinking reaction comprises: an ultra-filtration base membrane is placed in an acidic aqueous solution of glucose (the base membrane is submerged in and covered with the aqueous solution) to perform the chemical crosslinking reaction at 30° C. to 60° C. for 5 min to 30 min, and then washed with deionized water to obtain the nano-filtration membrane. The crosslinking is achieved by an esterification reaction of the reactive groups in the ultra-filtration base membrane with the hydroxyl groups in glucose.

Further, in the above method for preparing a high-strength anti-pollution anti-bacterial hollow fiber nano-filtration membrane, the acidic aqueous solution of glucose comprises 0.5 wt % to 5 wt % of hydrochloric acid and 10 wt % to 50 wt % of glucose.

In the above method for preparing a high-strength anti-pollution anti-bacterial hollow fiber nano-filtration membrane, the specific procedure of step S1 of the chemical crosslinking reaction comprises: an ultra-filtration base membrane is placed in an aqueous solution of phytic acid (the base membrane is submerged in and covered with the aqueous solution) to perform the chemical crosslinking reaction at 30° C. to 60° C. for 5 min to 40 min, and then washed with deionized water to obtain the nano-filtration membrane. The crosslinking is achieved by an esterification reaction of the reactive groups in the ultra-filtration base membrane with the phosphate groups in phytic acid.

Further, in the above method for preparing a high-strength anti-pollution anti-bacterial hollow fiber nano-filtration membrane, the aqueous solution of phytic acid comprises 10 wt % to 40 wt % of phytic acid.

In the above method for preparing a high-strength anti-pollution anti-bacterial hollow fiber nano-filtration membrane, the specific procedure of step S2 of the neutralization reaction comprises: the nano-filtration membrane obtained in step S1 is immersed in an alkali solution (the membrane is submerged in and covered with the alkali solution) to perform the neutralization reaction at 20° C. to 40° C. for 30 s to 60 s, then taken out and washed with distilled water to be neutral. Residual phytic acid on the nano-filtration membrane or unreacted acrylic acid in the poly(styrene-g-acrylic acid) (SAA) is neutralized with an alkali to form a corresponding salt. Unreacted phytic acid can be completely neutralized and no damage is caused to the structure of PVDF.

Further, in the above method for preparing a high-strength anti-pollution anti-bacterial hollow fiber nano-filtration membrane, the alkali solution is sodium hydroxide aqueous solution or potassium hydroxide aqueous solution; the sodium hydroxide aqueous solution comprises 0.1 wt % to 0.5 wt % of sodium hydroxide; the potassium hydroxide aqueous solution comprises 0.1 wt % to 0.5 wt % of potassium hydroxide.

In the above method for preparing a high-strength anti-pollution anti-bacterial hollow fiber nano-filtration membrane, the specific procedure of step S3 of loading inorganic anti-bacterial agent comprises: the membrane obtained in step S2 is placed in an inorganic anti-bacterial agent solution (the membrane is submerged in and covered with the solution) to perform complexing process at 20° C. to 40° C. for 10 min to 60 min, then taken out, washed with distilled water to be neutral, and vacuum dried at room temperature, thereby obtaining the high-strength anti-pollution anti-bacterial hollow fiber nano-filtration membrane.

Further, in the above method for preparing a high-strength anti-pollution anti-bacterial hollow fiber nano-filtration membrane, the inorganic anti-bacterial agent solution is an aqueous solution of silver nitrate comprising 0.05 wt % to 0.5 wt % of silver nitrate. Phytate groups or acrylate groups in poly(styrene-g-sodium acrylate) (SAA sodium salt) have strong ability to complex with metal ions and can form a coordination bond, ensuring that metal ions are not easily detached. Therefore, they can complex with silver ions to form a silver-loaded anti-bacterial nano-filtration membrane. In addition, hydroxyl groups in glucose can also complex with silver ions.

In the above method for preparing a high-strength anti-pollution anti-bacterial hollow fiber nano-filtration membrane, the ultra-filtration base membrane is PVDF/SAA/SAA sodium salt ultra-filtration base membrane or PVDF/EVOH ultra-filtration base membrane. The reactive groups of the ultra-filtration base membrane may be: acrylic acid in poly(styrene-g-acrylic acid) (SAA) or hydroxyl groups in polyethylene-vinyl alcohol copolymer (EVOH).

In the above method for preparing a high-strength anti-pollution anti-bacterial hollow fiber nano-filtration membrane, the PVDF/SAA/SAA sodium salt ultra-filtration base membrane is prepared according to the method disclosed in ZL201610174329.9, specifically including the following steps: in a mixer, PVDF, SAA, SAA sodium salt, diluent and antioxidant thoroughly mixed at a mass ratio of 20~30:2~9:1~3:57.9~74.9:0.1~1, then extruded through an extruder, cooled in air and granulated; the mixture particles are spun through an extruder at 120° C. to 170° C.; after cooled in air, the product is cooled and molded in the water of room temperature, then soaked and washed twice with an ethanol of room temperature, each time for 1 hour, to obtain the PVDF/SAA/SAA sodium salt ultra-filtration base membrane; wherein the diluent is tributyrin, and the antioxidant is β-(3,5-di-tert-butyl-4-hydroxyphenyl)octadecyl propionate. The ultra-filtration membrane has a retention rate of not less than 90% for BSA.

In the above method for preparing a high-strength anti-pollution anti-bacterial hollow fiber nano-filtration membrane, the PVDF/EVOH ultra-filtration base membrane is prepared according to the method disclosed in ZL201610174081.6, specifically including the following steps: in a mixer, PVDF, EVOH, diluent and antioxidant are thoroughly mixed at a mass ratio of 20~30:2~9:61~78:0.1~1, then extruded through an extruder, cooled in air and granulated; the mixture particles are spun through an extruder at 140° C. to 170° C.; after cooled in air, the product is cooled and molded in the water of room temperature, then soaked and washed twice with a water of room temperature, each time for 1 hour, to obtain the PVDF/EVOH ultra-filtration base membrane; wherein the diluent is ethylene carbonate and diethylene glycol, and the mass ratio of ethylene carbonate to diethylene glycol is 1:1; the antioxidant is β-(3,5-di-tert-butyl-4-hydroxyphenyl) octadecyl propionate. The ultra-filtration membrane has a retention rate of not less than 90% for BSA.

In the above process for preparing the PVDF/SAA/SAA sodium salt ultra-filtration base membrane or the PVDF/EVOH ultra-filtration base membrane, the cooling in air is performed by air cooling of 0.5 cm to 20 cm, i.e., the air path (also known as air gap) through which the polymer solution ejected from the spinneret orifice enters the cooling pool is 0.5 cm to 20 cm, causing a small amount of diluent to volatilize to form a compact layer having a certain compactness. The weight average molecular weight of PVDF is 530,000 to 700,000; the proportion of the number of AA repeating units in SAA is 20% to 30%, and the proportion of the number of AA group repeating units in SAA sodium salt is 20% to 30%; the proportion of the number of vinyl repeating units in EVOH is 27% to 38%, and the melt index of EVOH is 1.7 g/10 min to 4.0 g/10 min.

The present disclosure provides a high-strength anti-pollution anti-bacterial hollow fiber nano-filtration membrane obtained by the above method for preparing a high-strength anti-pollution anti-bacterial hollow fiber nano-filtration membrane.

The nano-filtration membrane prepared by the preparation method of the present disclosure is a type of hollow fiber nano-filtration membrane, and compared with the conventional spiral-wound membrane, the hollow fiber membrane of the present disclosure has three advantages: (1) the loading density is 3 to 10 times higher than that of the spiral-wound membrane; therefore, at the same loading density, the filtration area of the hollow fiber membrane is significantly higher than that of the spiral-wound membrane, and the corresponding theoretical water production is significantly higher than that of the spiral-wound membrane, the hollow fiber membrane is more suitable for large-scale nano-filtration desalination; (2) the membrane does not need a supporting material, and as long as the inner diameter and wall thickness of the hollow fiber membrane are controlled, it can withstand pressure up to 5.0 MPa without breaking, much higher than the maximum operating pressure of the nano-filtration membrane of 1.0 MPa; (3) the preparation process of hollow fiber membrane is simple than that of the spiral-wound membrane, and can be backwashed.

The preparation method of the present disclosure resides in further treatment on the ultra-filtration base membrane to finally obtain the hollow fiber nano-filtration membrane of the present disclosure. The ultra-filtration base membrane of the present disclosure can be selected from PVDF/SAA/SAA sodium salt ultra-filtration base membrane or PVDF/EVOH ultra-filtration base membrane. The ultra-filtration base membrane of the present disclosure can be prepared according to the NIPS method or the method in the literature ("Preparation of PVDF/EVOH Blend Membrane and Analysis of Anti-pollution Characteristics" (Qiaoyun Cai, Lei Wang, Rui Miao et al., Membrane Science and Technology, 35(1) 2015, 28-34)). The ultra-filtration base membrane of the present disclosure can be prepared preferably according to the methods disclosed in ZL201610174081.6 and ZL201610174329.9, which are methods for preparing a membrane having ultra-filtration pore size by using TIPS and blending modification technology. In conventional methods for preparing the nano-filtration membrane, the base membrane materials such as PVDF, PSF or PES (polyether sulfone) are all linear polymers, in which the spacing between molecular chains is large, resulting in the poor desalination effect. Although crosslinking can form a three-dimensional structure to increase the compactness of the desalting layer, the studies have found that only the crosslinking performed on the basis of ultra-filtration pore size can form a compact desalting layer. The method for preparing the ultra-filtration base membrane preferably used in the present disclosure refers to the thermal induced phase separation technology (TIPS), which is a version of the melt spinning technology and has successfully realized the commercial manufacture of the PVDF hollow fiber microfiltration membrane; compared with the conventional technology, the obvious advantages of the TIPS are that the membrane can be stored in the dry state and there is less factors affecting the membrane structure. The material of the ultra-filtration base membrane in the present disclosure is PVDF membrane, because it has better toughness than PSF membrane.

In order to facilitate the backwashing of the membrane, an external pressure operation mode is required. Different from the spiral-wound membrane, since the outer diameter of the hollow fiber membrane is small, two types of processes that require two steps to realize the crosslinking, i.e., the interfacial polymerization and the "coating-crosslinking", carried out on the outer surface of the hollow fiber membrane are difficult to obtain a thin and uniform desalting layer, and thus are not suitable for use in external pressure operation. That is, neither the interfacial polymerization nor the "coating-crosslinking" is suitable for use as a process for preparing an external pressure type hollow fiber nano-filtration membrane. In the present disclosure, the crosslinking reaction uses phytic acid or glucose as reaction compounds. Phytic acid and glucose are polyfunctional compounds containing reactive functional groups, which achieve one-step reaction with the reactive functional groups of SAA or EVOH in the ultra-filtration base membrane and form a three-dimensional cross-linked structure. Since the crosslinking only occurs on the surface of the membrane, the desalting layer is thin and compact, effectively reduces the filtration resistance and increases the membrane flux, and is suitable for the external pressure operation mode and convenient for backwashing of the membrane.

The hydrophilicity of the material has great influence on the flux and anti-pollution property of the membrane, but after the hydrophilic functional groups of the crosslinking monomer are crosslinked, the functional groups are consumed, thereby reducing the hydrophilicity of the membrane. Phytic acid or glucose used in the present disclosure is crosslinked with the reactive functional groups of SAA or EVOH in the ultra-filtration base membrane to form a three-dimensional structure; due to the steric-hindrance effect, not all of the phosphate groups in phytic acid and the hydroxyl groups in glucose will be subjected to the reaction, and the phosphate groups or hydroxyl groups remained after the crosslinking reaction can further improve the hydrophilicity, anti-pollution performance and mechanical property of the membrane. Furthermore, by neutralization reaction, the carboxyl groups in unreacted SAA or the phosphate groups in phytic acid can be converted into the corresponding salt, which not only maintains better hydrophilic properties, increases membrane flux, but also provides more acid groups to participate in the subsequent complexing reaction. In addition, the SAA sodium salt will dissociate in water, and the sodium ions enter into water, while the acrylate groups remain on the polymer. The acrylate group has a strong ability to complex with the subgroup metal ions, such as silver ions, thus facilitates the subsequent complexing reactions.

During the use of the nano-filtration membrane, microorganisms and bacteria in water will deposit and reproduce on the membrane, form a biofilm and result in pollution of the nano-filtration membrane, and cause a sharp decrease in the flux of the membrane. The hollow fiber nano-filtration membrane of the present disclosure simultaneously introduces two types of functional groups in the membrane material; one type is silver ion possessing broad-spectrum anti-bacterial effect; the other type is carboxylate group and phytate group, which are functional groups possessing good anti-bacterial effects on most of bacteria. Therefore, the anti-bacterial property of the membrane is further improved, and the membrane pollution caused by the organism is effectively alleviated.

As described above, in the present disclosure, the ultra-filtration base membrane prepared by using TIPS technology is subjected to one-step crosslinking to form a desalting layer, and then subjected to complexing treatment to load an inorganic anti-bacterial agent, thereby preparing a hollow fiber nano-filtration membrane. The obtained membrane can overcome the defects of the existing spiral-wound nano-filtration membrane, and the membrane can be dry-preserved and self-supporting. The hydrophilicity, anti-pollution performance and mechanical property of the membrane are further improved, while excellent anti-bacterial function is achieved.

The nano-filtration membrane prepared by the present disclosure is tested for performance evaluation: the anti-bacterial effect of the membrane is evaluated by GB15797-1995, and the anti-bacterial rate against *Escherichia coli* is not lower than 99.6% at 72 hours; the desalinization rate against sodium sulfate aqueous solution of a concentration of 2000 mg/L is not less than 95%; the membrane flux recovery rate after chemical cleaning is not less than 95% (cleaning solution is citric acid aqueous solution at pH=3 and "sodium hydroxide/EDTA" aqueous solution at pH=10.5); the mechanical property of the monofilament of the membrane is not less than 12 MPa. The test results are shown in Table 1 and Table 2.

TABLE 1

Performance parameters of PVDF/SAA/SAA sodium salt base nano-filtration membrane

| | Example 5 | Example 6 |
|---|---|---|
| Mechanical property (MPa) | 13 | 14 |
| Flux recovery rate after chemical cleaning (%) | 96 | 97 |
| Anti-bacterial rate against *Escherichia coli* (72 hours, %) | 99.6 | 99.7 |
| Desalinization rate against sodium sulfate aqueous solution (2000 mg/L, %) | 95.6 | 97.1 |

TABLE 2

Performance parameters of PVDF/EVOH base nano-filtration membrane

|  | Example 10 | Example 11 |
|---|---|---|
| Mechanical property (MPa) | 15 | 12 |
| Flux recovery rate after chemical cleaning (%) | 97 | 96 |
| Anti-bacterial rate against *Escherichia coli* (72 hours, %) | 99.6 | 99.8 |
| Desalinization rate against sodium sulfate aqueous solution (2000 mg/L, %) | 97.3 | 96.8 |

The beneficial effects of the present disclosure reside in: the method for preparing a high-strength anti-pollution anti-bacterial hollow fiber nano-filtration membrane provided in the present disclosure has following advantages: (1) the crosslinking process is simple and the reaction conditions are mild. Phytic acid or glucose is a polyfunctional compound containing reactive functional groups, can be subjected to one-step reaction with reactive functional groups of SAA or EVOH to form a three-dimensional cross-linked structure; since crosslinking only occurs on the surface of the membrane, the desalting layer is thin and compact, effectively reducing the filtration resistance. Due to the steric-hindrance effect, not all of the phosphate groups in phytic acid and the hydroxyl groups in glucose are subjected to the reactions, and the remaining phosphate groups or hydroxyl groups further improve the hydrophilicity, anti-pollution performance and mechanical property of the membrane. (2) By neutralization reaction, the carboxyl groups in unreacted SAA or the phosphate groups in phytic acid can be converted into the corresponding salt, which not only provides more acid groups to participate in the subsequent complexing reaction, but also maintains better hydrophilic property. (3) Carboxylate group or phytic acid has an anti-bacterial effect, and carboxylate group or phytate group is complexed with silver ions, so that silver ions possessing broad-spectrum anti-bacterial property are introduced into the membrane, and the prepared nano-filtration membrane possesses excellent anti-bacterial effect. (4) The preparation method is simple and needs less steps, the operation is easy, and the reaction conditions are mild and easy to control. (5) The obtained nano-filtration membrane possesses high membrane flux, good hydrophilic property, good mechanical property, strong anti-pollution performance and excellent anti-bacterial property.

DETAILED DESCRIPTION

The present disclosure is further described in conjunction with specific embodiments.

Example 1: Preparation of PVDF/SAA/SAA Sodium Salt Ultra-Filtration Base Membrane The PVDF/SAA/SAA sodium salt ultra-filtration base membrane was prepared according to the method disclosed in ZL201610174329.9, specifically including the following steps: in a mixer, PVDF, SAA, SAA sodium salt, diluent and antioxidant were thoroughly mixed at a mass ratio of 20~30:2~9:1~3:57.9~74.9:0.1~1, then extruded through an extruder, cooled in air and granulated; the mixture particles obtained were spun through an extruder at 120° C. to 170° C.; after cooled in air, the product was cooled and molded in the water of room temperature, then soaked and washed twice with the ethanol of room temperature, each time for 1 hour, to obtain the PVDF/SAA/SAA sodium salt ultra-filtration base membrane; wherein the diluent was tributyrin, and the antioxidant was β-(3,5-di-tert-butyl-4-hydroxyphenyl) octadecyl propionate. The cooling in air was performed by air cooling of 0.5 cm to 20 cm, i.e., the air path (also known as air gap) through which the polymer solution ejected from the spinneret orifice entered the cooling pool was 0.5 cm to 20 cm. The weight average molecular weight of PVDF was 530,000 to 700,000; the proportion of the number of AA repeating units in SAA was 20% to 30%, and the proportion of the number of AA group repeating units in SAA sodium salt was 20% to 30%.

Example 2: Preparation of PVDF/EVOH Ultra-Filtration Base Membrane

The PVDF/EVOH ultra-filtration base membrane was prepared according to the method disclosed in ZL201610174081.6, specifically including the following steps: in a mixer, PVDF, EVOH, diluent and antioxidant were thoroughly mixed at a mass ratio of 20~30:2~9:61~78:0.1~1, then extruded through an extruder, and cooled in air and granulated; the obtained mixture particles were spun through an extruder at 140° C. to 170° C.; after cooling in air, the product was cooled and molded in the water of room temperature, then soaked and washed twice with the water of room temperature, each time for 1 hour, to obtain the PVDF/EVOH ultra-filtration base membrane; wherein the diluent was ethylene carbonate and diethylene glycol, and the mass ratio of ethylene carbonate to diethylene glycol was 1:1; the antioxidant was β-(3,5-di-tert-butyl-4-hydroxyphenyl) octadecyl propionate. The cooling in air was performed by air cooling of 0.5 cm to 20 cm, i.e., the air path (also known as air gap) through which the polymer solution ejected from the spinneret orifice entered the cooling pool was 0.5 cm to 20 cm. The weight average molecular weight of PVDF was 530,000 to 700,000; the proportion of the number of vinyl repeating units in EVOH was 27% to 38%, and the melt index of EVOH was 1.7 g/10 min to 4.0 g/10 min.

Example 3

The method for preparing a high-strength anti-pollution anti-bacterial hollow fiber nano-filtration membrane comprised the following steps:

S1, a chemical crosslinking reaction: the PVDF/SAA/SAA sodium salt ultra-filtration base membrane prepared in Example 1 was placed in an acidic aqueous solution of glucose for the chemical crosslinking reaction at 30° C. for 30 min, and then washed with deionized water to obtain a nano-filtration membrane; wherein, in the acidic aqueous solution of glucose, the mass concentration of hydrochloric acid was 0.5%, and the mass concentration of glucose was 10%;

S2, a neutralization reaction: the nano-filtration membrane obtained in step S1 was immersed in an alkali solution for the neutralization reaction at 20° C. for 60 s, then taken out and washed with distilled water to be neutral; wherein the alkali solution was sodium hydroxide aqueous solution, and the mass concentration of sodium hydroxide in the sodium hydroxide aqueous solution was 0.1%;

S3, loading inorganic anti-bacterial agent: the membrane obtained in step S2 was placed in an inorganic anti-bacterial agent solution for complexation at 20° C. for 60 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.05%.

Example 4

The method for preparing a high-strength anti-pollution anti-bacterial hollow fiber nano-filtration membrane comprised the following steps:

S1, a chemical crosslinking reaction: the PVDF/SAA/SAA sodium salt ultra-filtration base membrane prepared in Example 1 was placed in an acidic aqueous solution of glucose for the chemical crosslinking reaction at 60° C. for 5 min, and then washed with deionized water to obtain a nano-filtration membrane; wherein, in the acidic aqueous solution of glucose, the mass concentration of hydrochloric acid was 5%, and the mass concentration of glucose was 50%;

S2, a neutralization reaction: the nano-filtration membrane obtained in step S1 was immersed in an alkali solution for the neutralization reaction at 40° C. for 30 s, then taken out and washed with distilled water to be neural; wherein the alkali solution was sodium hydroxide aqueous solution, and the mass concentration of sodium hydroxide in the sodium hydroxide aqueous solution was 0.5%;

S3, loading inorganic anti-bacterial agent: the membrane obtained in step S2 was placed into an inorganic anti-bacterial agent solution for complexation at 40° C. for 10 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.5%.

Example 5

The method for preparing a high-strength anti-pollution anti-bacterial hollow fiber nano-filtration membrane comprised the following steps:

S1, a chemical crosslinking reaction: the PVDF/SAA/SAA sodium salt ultra-filtration base membrane prepared in Example 1 was placed in an acidic aqueous solution of glucose for the chemical crosslinking reaction at 50° C. for 20 min, and then washed with deionized water to obtain a nano-filtration membrane; wherein, in the acidic aqueous solution of glucose, the mass concentration of hydrochloric acid was 3%, and the mass concentration of glucose was 30%;

S2, a neutralization reaction: the nano-filtration membrane obtained in step S1 was immersed in an alkali solution for the neutralization reaction at 30° C. for 45 s, then taken out and washed with distilled water to be neural; wherein the alkali solution was potassium hydroxide aqueous solution, and the mass concentration of potassium hydroxide in the potassium hydroxide aqueous solution was 0.4%;

S3, loading inorganic anti-bacterial agent: the membrane obtained in step S2 was placed in an inorganic anti-bacterial agent solution for complexation at 30° C. for 35 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.1%.

Example 6

The method for preparing a high-strength anti-pollution anti-bacterial hollow fiber nano-filtration membrane comprised the following steps:

S1, a chemical crosslinking reaction: the PVDF/SAA/SAA sodium salt ultra-filtration base membrane prepared in Example 1 was placed in an acidic aqueous solution of glucose for the chemical crosslinking reaction at 40° C. for 10 min, and then washed with deionized water to obtain a nano-filtration membrane; wherein, in the acidic aqueous solution of glucose, the mass concentration of hydrochloric acid was 1%, and the mass concentration of glucose was 40%;

S2, a neutralization reaction: the nano-filtration membrane obtained in step S1 was immersed in an alkali solution for the neutralization reaction at 35° C. for 50 s, then taken out and washed with distilled water to be neural; wherein the alkali solution was sodium hydroxide aqueous solution, and the mass concentration of sodium hydroxide in the sodium hydroxide aqueous solution was 0.3%;

S3, loading inorganic anti-bacterial agent: the membrane obtained in step S2 was placed in an inorganic anti-bacterial agent solution for complexation at 25° C. for 50 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.4%.

Example 7

The method for preparing a high-strength anti-pollution anti-bacterial hollow fiber nano-filtration membrane comprised the following steps:

S1, a chemical crosslinking reaction: the PVDF/SAA/SAA sodium salt ultra-filtration base membrane was placed in an acidic aqueous solution of glucose for the chemical crosslinking reaction at 35° C. for 15 min, and then washed with deionized water to obtain the nano-filtration membrane; wherein, in the acidic aqueous solution of glucose, the mass concentration of hydrochloric acid was 2.5%, and the mass concentration of glucose was 20%;

S2, a neutralization reaction: the nano-filtration membrane obtained in step S1 was immersed in an alkali solution for the neutralization reaction at 25° C. for 40 s, then taken out and washed with distilled water to be neural; wherein the alkali solution was potassium hydroxide aqueous solution, and the mass concentration of potassium hydroxide in the potassium hydroxide aqueous solution was 0.2%;

S3, loading inorganic anti-bacterial agent: the membrane obtained in step S2 was placed in an inorganic anti-bacterial agent solution for complexation at 35° C. for 25 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.3%.

The PVDF/SAA/SAA sodium salt ultra-filtration base membrane was prepared by the following steps: 15 weight parts of polymer material, a total of 1.5 weight parts of poly(styrene-g-acrylic acid) and poly(styrene-g-sodium acrylate), 83.5 weight parts of solvent were weighted; the polymer material was polyvinylidene fluoride (weight average molecular weight was 337,000); the solvent was N,N- dimethylacetamide. The polymer material, poly(styrene-g-acrylic acid), poly(styrene-g-sodium acrylate) and solvent were placed in a mixer and thoroughly mixed at a temperature of 60° C. to form a solution. The solution was subjected to static defoaming, then extruded under a pressure of 0.2 MPa at 60° C., followed by air cooling of 2.0 cm, cooled and molded in the water of room temperature. The product was soaked and washed with the deionized water of room temperature for 5 hours, followed by second soaking and washing with the deionized water of room temperature for 5 hours. The membrane was dried in air.

Example 8

The method for preparing a high-strength anti-pollution anti-bacterial hollow fiber nano-filtration membrane comprised the following steps:

S1, a chemical crosslinking reaction: the PVDF/EVOH ultra-filtration base membrane prepared in Example 2 was placed in an aqueous solution of phytic acid for the chemical crosslinking reaction at 30° C. for 40 min, and then washed with deionized water to obtain a nano-filtration membrane; wherein the mass concentration of phytic acid in the aqueous solution of phytic acid was 10%;

S2, a neutralization reaction: the nano-filtration membrane obtained in step S1 was immersed in an alkali solution for the neutralization reaction at 20° C. for 60 s, then taken out and washed with distilled water to be neural; wherein the alkali solution was sodium hydroxide aqueous solution, and the mass concentration of sodium hydroxide in the sodium hydroxide aqueous solution was 0.5%;

S3, loading inorganic anti-bacterial agent: the membrane obtained in step S2 was placed into an inorganic anti-bacterial agent solution for complexation at 20° C. for 60 min, then taken out and washed with distilled water to be neural, vacuum dried at room temperature, to obtained a high-strength anti-pollution anti-bacterial hollow fiber nano-filtration membrane, wherein the inorganic anti-bacterial agent solution was silver nitrate aqueous solution and the mass concentration of silver nitrate was 0.2%.

Example 9

The method for preparing a high-strength anti-pollution anti-bacterial hollow fiber nano-filtration membrane comprised the following steps:

S1, a chemical crosslinking reaction: the PVDF/EVOH ultra-filtration base membrane prepared in Example 2 was placed in an aqueous solution of phytic acid for the chemical crosslinking reaction at 60° C. for 5 min, and then washed with deionized water to obtain a nano-filtration membrane; wherein the mass concentration of phytic acid in the aqueous solution of phytic acid was 40%;

S2, a neutralization reaction: the nano-filtration membrane obtained in step S1 was immersed in an alkali solution for the neutralization reaction at 40° C. for 30 s, then taken out and washed with distilled water to be neural; wherein the alkali solution was potassium hydroxide aqueous solution, and the mass concentration of potassium hydroxide in the potassium hydroxide aqueous solution was 0.45%;

S3, loading inorganic anti-bacterial agent: the membrane obtained in step S2 was placed in an inorganic anti-bacterial agent solution for complexation at 40° C. for 10 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.25%.

Example 10

The method for preparing a high-strength anti-pollution anti-bacterial hollow fiber nano-filtration membrane comprised the following steps:

S1, a chemical crosslinking reaction: the PVDF/EVOH ultra-filtration base membrane prepared in Example 2 was placed in an aqueous solution of phytic acid for the chemical crosslinking reaction at 50° C. for 10 min, and then washed with deionized water to obtain a nano-filtration membrane; wherein the mass concentration of phytic acid in the aqueous solution of phytic acid was 25%;

S2, a neutralization reaction: the nano-filtration membrane obtained in step S1 was immersed in an alkali solution for the neutralization reaction at 35° C. for 40 s, then taken out and washed with distilled water to be neural; wherein the alkali solution was sodium hydroxide aqueous solution, and the mass concentration of sodium hydroxide in the sodium hydroxide aqueous solution was 0.1%;

S3, loading inorganic anti-bacterial agent: the membrane obtained in step S2 was placed in an inorganic anti-bacterial agent solution for complexation at 35° C. for 15 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution and the mass concentration of silver nitrate was 0.35%.

Example 11

The method for preparing a high-strength anti-pollution anti-bacterial hollow fiber nano-filtration membrane comprised the following steps:

S1, a chemical crosslinking reaction: the PVDF/EVOH ultra-filtration base membrane prepared in Example 2 was placed in an aqueous solution of phytic acid for the chemical crosslinking reaction at 40° C. for 20 min, and then washed with deionized water to obtain a nano-filtration membrane; wherein the mass concentration of phytic acid in the aqueous solution of phytic acid was 30%;

S2, a neutralization reaction: the nano-filtration membrane obtained in step S1 was immersed in an alkali solution for the neutralization reaction at 25° C. for 50 s, then taken out and washed with distilled water to be neural; wherein the alkali solution was sodium hydroxide aqueous solution, and the mass concentration of sodium hydroxide in the sodium hydroxide aqueous solution was 0.25%;

S3, loading inorganic anti-bacterial agent: the membrane obtained in step S2 was placed in an inorganic anti-bacterial agent solution for complexation at 30° C. for 30 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.45%.

Example 12

The method for preparing a high-strength anti-pollution anti-bacterial hollow fiber nano-filtration membrane comprised the following steps:

S1, a chemical crosslinking reaction: the PVDF/EVOH ultra-filtration base membrane was placed in an aqueous solution of phytic acid for the chemical crosslinking reaction at 35° C. for 30 min, and then washed with deionized water to obtain the nano-filtration membrane; wherein the mass concentration of phytic acid in the aqueous solution of phytic acid was 20%;

S2, a neutralization reaction: the nano-filtration membrane obtained in step S1 was immersed in an alkali solution for the neutralization reaction at 30° C. for 45 s, then taken out and washed with distilled water to be neural; wherein the alkali solution was potassium hydroxide aqueous solution, and the mass concentration of potassium hydroxide in the potassium hydroxide aqueous solution was 0.35%;

S3, loading inorganic anti-bacterial agent: the membrane obtained in step S2 was placed in an inorganic anti-bacterial agent solution for complexation at 25° C. for 45 min, then taken out and washed with distilled water to be neural, vacuum dried at room temperature, to obtain a high-strength anti-pollution anti-bacterial hollow fiber nano-filtration membrane, wherein the inorganic anti-bacterial agent solution was silver nitrate aqueous solution, and the mass concentration of silver nitrate was 0.3%.

The PVDF/EVOH ultra-filtration base membrane was prepared according to the method disclosed in the literature "Preparation of PVDF/EVOH Blend Membrane and Analysis of Anti-pollution Characteristics" (Qiaoyun Cai, Lei Wang, Rui Miao et al., Membrane Science and Technology, 35(1) 2015, 28-34), specifically comprising the following steps: in a mixer, PVDF, EVOH, LiCl, PEG20000, DMAc (dimethylacetamide) were mixed at a mass ratio of 15~19:1~5:1~3:1~3:74~80 at 60° C. for 24 hours, the mixture was subjected to static defoaming for 2 h and air cooling; the product was cooled and molded in a coagulating bath at 0° C. to 25° C., then soaked and washed twice with the water of room temperature, each time for 1 hour, to obtain the PVDF/EVOH ultra-filtration base membrane.

What is claimed is:

1. A method for preparing a hollow fiber nano-filtration membrane, comprising:
   (1) placing an ultra-filtration base membrane in an acidic aqueous solution of glucose or an aqueous solution of phytic acid for a chemical crosslinking reaction to obtain a nano-filtration membrane, wherein the ultra-filtration base membrane is a PVDF/SAA/SAA sodium salt ultra-filtration base membrane or a PVDF/EVOH ultra-filtration base membrane, and wherein the PVDF/SAA/SAA sodium salt ultra-filtration base membrane is placed in the acidic aqueous solution of glucose, and the PVDF/EVOH ultra-filtration base membrane is placed in the aqueous solution of phytic acid;
   (2) immersing the nano-filtration membrane obtained in step (1) in an alkali solution for a neutralization reaction, and then washing the membrane to be neutral; and
   (3) placing the membrane obtained in step (2) in an inorganic anti-bacterial agent solution for complexation, thereby obtaining a hollow fiber nano-filtration membrane.

2. The method of claim 1, wherein step (1) comprises: placing an ultra-filtration base membrane in an acidic aqueous solution of glucose to perform the chemical crosslinking reaction at 30° C. to 60° C. for 5 min to 30 min, and then washing the membrane with deionized water to obtain a nano-filtration membrane.

3. The method of claim 2, wherein the acidic aqueous solution of glucose comprises 0.5 wt % to 5 wt % of hydrochloric acid, and 10 wt % to 50 wt % of glucose.

4. The method of claim 1, wherein step (1) comprises: placing an ultra-filtration base membrane in an aqueous solution of phytic acid to perform the chemical crosslinking reaction at 30° C. to 60° C. for 5 min to 40 min, and then washing the membrane with deionized water to obtain a nano-filtration membrane.

5. The method of claim 4, wherein the aqueous solution of phytic acid comprises 10 wt % to 40 wt % of phytic acid.

6. The method of claim 1, wherein step (2) comprises: immersing the nano-filtration membrane obtained in step (1) in an alkali solution to perform the neutralization reaction at 20° C. to 40° C. for 30 s to 60 s, and then taking the membrane out and washing the membrane with distilled water to be neutral.

7. The method of claim 6, wherein the alkali solution is sodium hydroxide aqueous solution or potassium hydroxide aqueous solution; the sodium hydroxide aqueous solution comprises 0.1 wt % to 0.5 wt % of sodium hydroxide; and the potassium hydroxide aqueous solution comprises 0.1 wt % to 0.5 wt % of potassium hydroxide.

8. The method of claim 1, wherein step (3) comprises: placing the membrane obtained in step (2) in an inorganic anti-bacterial agent solution to perform complexing process at 20° C. to 40° C. for 10 min to 60 min, then taking the membrane out and washing the membrane with distilled water to be neutral, vacuum drying the membrane at room temperature, thereby obtaining the hollow fiber nano-filtration membrane.

9. The method of claim 8, wherein the inorganic anti-bacterial agent solution is silver nitrate aqueous solution comprising 0.05 wt % to 0.5 wt % of silver nitrate.

10. The method of claim 1, wherein the PVDF/SAA/SAA sodium salt ultra-filtration base membrane is prepared by the steps: in a mixer, PVDF, SAA, SAA sodium salt, diluent and antioxidant are thoroughly mixed at a mass ratio of 20~30:2~9:1~3:57.9~74.9:0.1~1, then extruded through an extruder, cooled in air and granulated; the obtained mixture particles are spun through an extruder at 120° C. to 170° C.; after cooling in air, the product is cooled and molded in a water of room temperature, then soaked and washed twice with an ethanol of room temperature, each time for 1 hour, to obtain the PVDF/SAA/SAA sodium salt ultra-filtration base membrane; wherein the diluent is tributyrin, and the antioxidant is β-(3,5-di-tert-butyl-4-hydroxyphenyl)octadecyl propionate.

11. The method of claim 1, wherein the PVDF/EVOH ultra-filtration base membrane is prepared by the steps: in a mixer, PVDF, EVOH, diluent and antioxidant thoroughly mixed at a mass ratio of 20~30:2~9:61~78:0.1~1, then extruded through an extruder, cooled in air and granulated; the obtained mixture particles are spun through an extruder at 140° C. to 170° C.; after cooling in air, the product is cooled and molded in a water of room temperature, then soaked and washed twice with a water of room temperature, each time for 1 hour, to obtain the PVDF/EVOH ultra-filtration base membrane; wherein the diluent is ethylene carbonate and diethylene glycol, and a mass ratio of ethylene carbonate to diethylene glycol is 1:1; the antioxidant is β-(3,5-di-tert-butyl-4-hydroxyphenyl)octadecyl propionate.

12. A hollow fiber nano-filtration membrane prepared by the method of claim 1.

* * * * *